United States Patent [19]
Cooper

[11] Patent Number: 5,415,246
[45] Date of Patent: May 16, 1995

[54] GAS PROJECTION APPARATUS FOR USE IN PREVENTING THE THEFT OF AN AUTOMOBILE

[75] Inventor: Guy F. Cooper, Ventura, Calif.

[73] Assignee: The United States of America as represented by the Secretary of the Navy, Washington, D.C.

[21] Appl. No.: 308,330

[22] Filed: Sep. 19, 1994

[51] Int. Cl.$^6$ .............................................. B60R 25/00
[52] U.S. Cl. ..................... 180/287; 89/1.11; 222/3; 239/289; 239/463
[58] Field of Search ................ 180/287; 239/289, 463, 239/472, 453; 89/1.11; 222/3, 608

[56] References Cited

U.S. PATENT DOCUMENTS

| | | | |
|---|---|---|---|
| 1,364,152 | 1/1921 | Steinmetz | 89/1.11 |
| 3,788,527 | 1/1974 | Matson | 222/195 |
| 4,762,198 | 8/1988 | Vagnone et al. | 180/287 |
| 4,790,406 | 12/1988 | Ferrell | 180/287 |
| 4,880,147 | 11/1989 | Tolan | 222/195 |

*Primary Examiner*—Margaret A. Focarino
*Assistant Examiner*—Paul N. Dickson
*Attorney, Agent, or Firm*—David S. Kalmbaugh

[57] ABSTRACT

A gas projection apparatus for disabling the engine of an automobile being pursued by, for example, a police cruiser. The gas projection apparatus comprises a housing having a charging chamber which receives carbon dioxide gas under pressure from an external source of supply. The charging chamber is partially sealed by a blast valve which is attached to a movable shaft centrally located within the housing. There is also attached to the movable shaft a diaphragm which is positioned in a rear chamber of the housing adjacent the charging chamber. Carbon dioxides from the charging chamber is supplied to the rear chamber exerting a force on the diaphragm. When the force exerted by carbon dioxide gas on the diaphragm exceeds a predetermined pressure level, the diaphragm moves the shaft unseating the blast valve which the pressurized carbon dioxide gas to enter a wave shaping chamber within the housing. A pair of annular ports at the front end of the housing receive the pressurized carbon dioxide gas from the wave shaping chamber and, in combination, with the wave shaping chamber form a train of ring vortices of carbon dioxide gas. The train of ring vortices of carbon dioxide gas is directed to the engine of the automobile being pursued causing the automobile to slow and eventually stall.

13 Claims, 4 Drawing Sheets

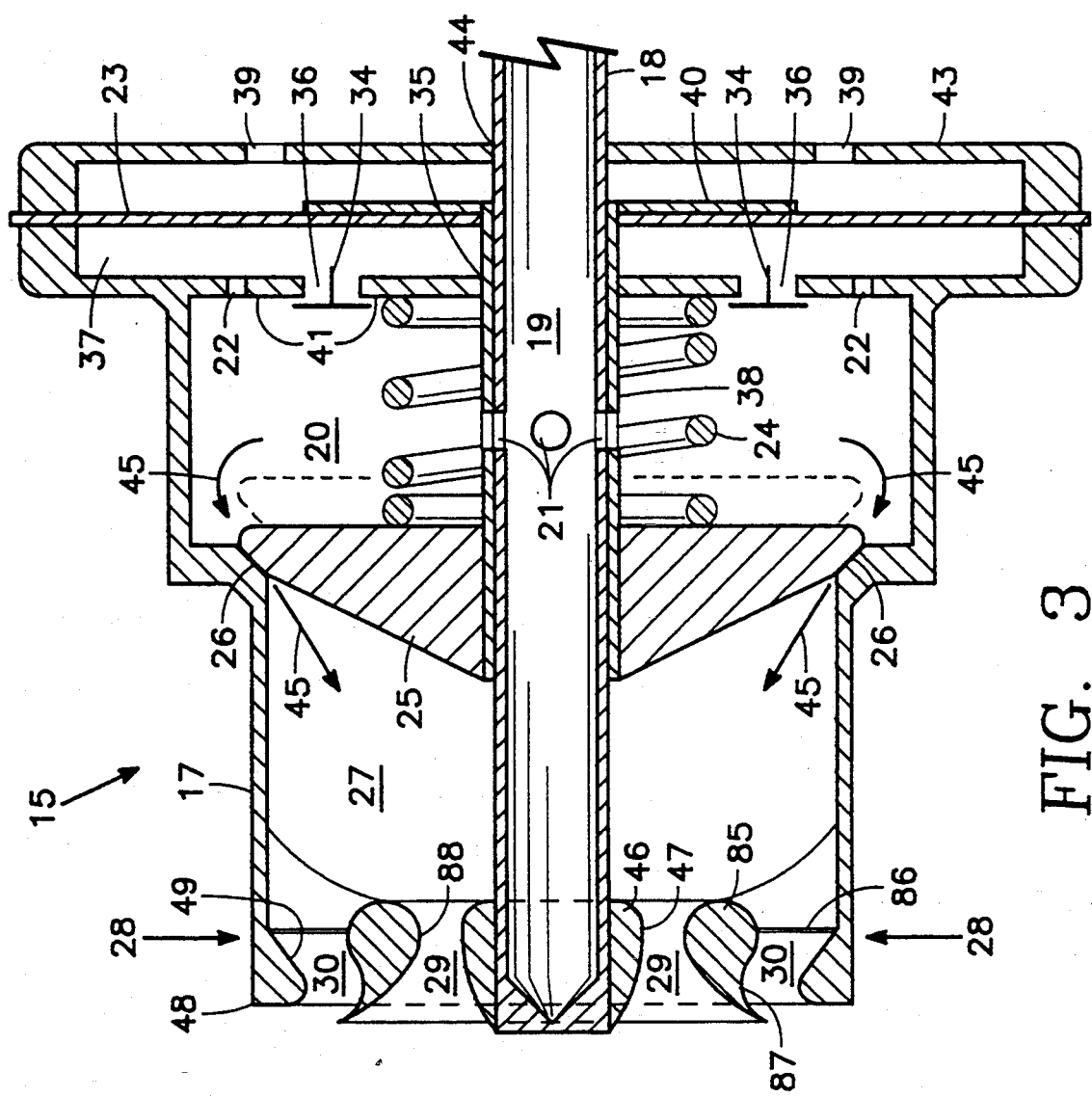
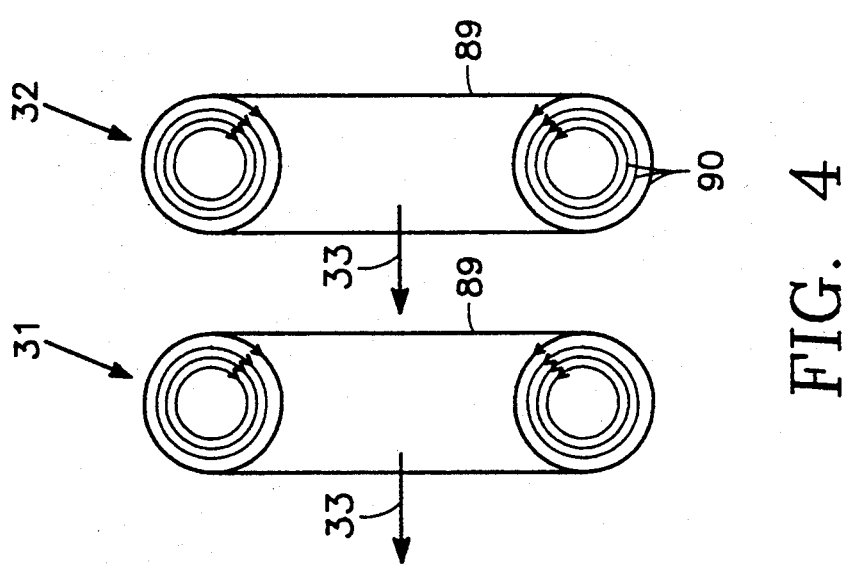
FIG. 3
FIG. 4

5,415,246

GAS PROJECTION APPARATUS FOR USE IN PREVENTING THE THEFT OF AN AUTOMOBILE

BACKGROUND OF THE INVENTION

1. Field of the Invention

The present invention relates generally to an automobile anti-theft apparatus. More specifically the present invention relates to a gas projection apparatus for generating a train of gas ring vortexes which may be aimed at a moving vehicle to stall the vehicle.

2. Description of the Prior Art

The theft of automobiles, trucks and like moving vehicles is one of the most serious crimes in the United States today. The loss to the economy of such automobile thefts is estimated to be in the hundreds of millions of dollar per year. Insurance premiums, already high, have skyrocketed as a result of such theft.

In addition, a new phenomena known as "car jacking" in which an automobile is stolen while an innocent victim, who is driving the automobile, is, for example, at a stop light or is parking the automobile. Car jackings often result in injury or even the death of the victim of the car jacking.

In the past a number of devices have been developed to assist in the prevention of thefts of automobiles, trucks and the like. These devices may be generally classified as active devices or passive devices. An active device is one which disables a system in the automobile, normally required to drive the vehicle. There are active systems which disable steering columns, fuel systems, transmissions and drive train systems, as well as steering wheels themselves.

For example, one such prior art active anti-theft device disclosed in U.S. Pat. No. 4,790,406 comprises a stainless shield permanently fixed to the shaft bowl of the steering column of an automobile. When assembled on a steering column, the shield moves the shaft bowl when the gear shift is moved. A lock assembly with a deadbolt is provided on the defender shield with this deadbolt mounted for radial movement with respect to the shield. The lock is positioned such that when the car is in the parked position the deadbolt enters the gate of the shaft device at a position such that the gear lever cannot be moved out of the park position.

A second active vehicle anti-theft system disclosed in U.S. Pat. No. 4,762,198 comprises an auxiliary switch that is interposed in the ignition controlling circuit between the main key switch and the ignition starting unit. The auxiliary switch is formed with normally open single pole, single break contacts located behind and spaced from the outer surface of a vehicle wall and access to the contacts is through a single small diameter entrance tube, which functions also to mount the switch behind the vehicle wall. The switch is provided with a separate probe which is insertable in the entrance tube so as to pass through the vehicle wall into engagement with the contacts of the switch, acting to close the contacts.

These and other prior art active anti-theft automobile systems function well to prevent theft of the automobile when the automobile is parked. However when the automobile is at a stop light and a car jacking occurs, the active anti-theft automobile systems currently available are unable to prevent a theft of the automobile and the possible harm to the driver of the automobile.

Other vehicle anti-theft systems are of a passive nature and do not disable the vehicle. These include audio alarms which alert anyone within listening range that there has been an unauthorized tampering with the lock systems or otherwise unauthorized entry into the vehicle. However, audio alarms are generally easily disabled by the thief. In addition, such alarm systems are frequently ignored as they are often inadvertently activated, such as by innocent passers-by.

What is needed is a relatively simple, yet highly effective vehicle anti-theft system which will effectively disable a moving vehicle thereby preventing vehicle theft and car jackings.

SUMMARY OF THE INVENTION

The present invention overcomes some of the disadvantages of the prior art including those mentioned above in that it comprises a relatively simple yet highly reliable and efficient gas projection apparatus for disabling the engine of an automobile being pursued by, for example, a police cruiser. The gas projection apparatus comprises a housing having a charging chamber which receives carbon dioxide gas under pressure from an external source of supply. The charging chamber is partially sealed by a blast valve which is attached to a movable shaft centrally located within the housing. There is also attached to the movable shaft a diaphragm which is positioned in a rear chamber of the housing adjacent the charging chamber. Carbon dioxides from the charging chamber is supplied to the rear chamber exerting a force on the diaphragm. When the force exerted by carbon dioxide gas on the diaphragm exceeds a predetermined pressure level, the diaphragm moves the shaft unseating the blast valve which the pressurized carbon dioxide gas to enter a wave shaping chamber within the housing. A pair of annular ports at the front end of the housing receive the pressurized carbon dioxide gas from the wave shaping chamber and, in combination, with the wave shaping chamber form a train of ring vortices of carbon dioxide gas. The train of ring vortices of carbon dioxide gas is directed to the engine of the automobile being pursued causing the automobile to slow and eventually stall.

BRIEF DESCRIPTION OF THE DRAWINGS

FIG. 3 is a sectional view of the gas projection apparatus constituting the present invention;

FIG. 4 is a sectional of a pair of ring vortices of carbon dioxide gas formed by the gas projection apparatus of FIG. 3;

DETAILED DESCRIPTION OF THE PREFERRED EMBODIMENT

Figure 1:
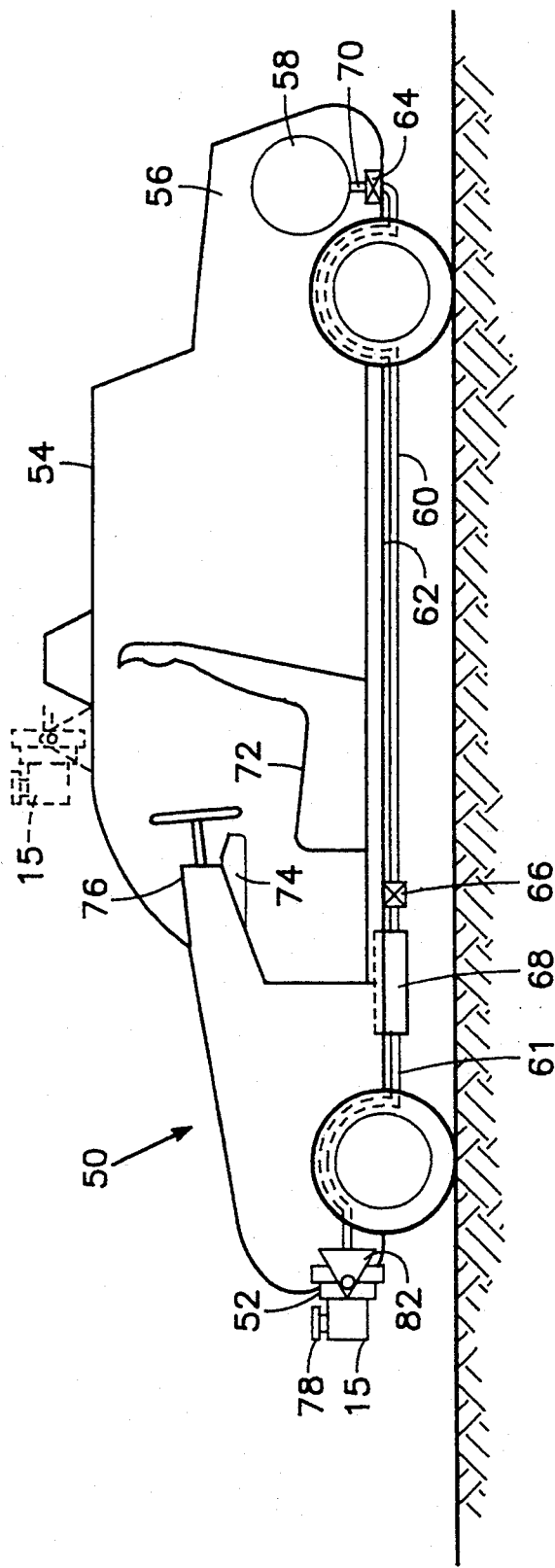
FIG. 1 illustrates a side view in partial section of an automobile having the gas projection apparatus constituting the present invention mounted thereon.
Figure 2:
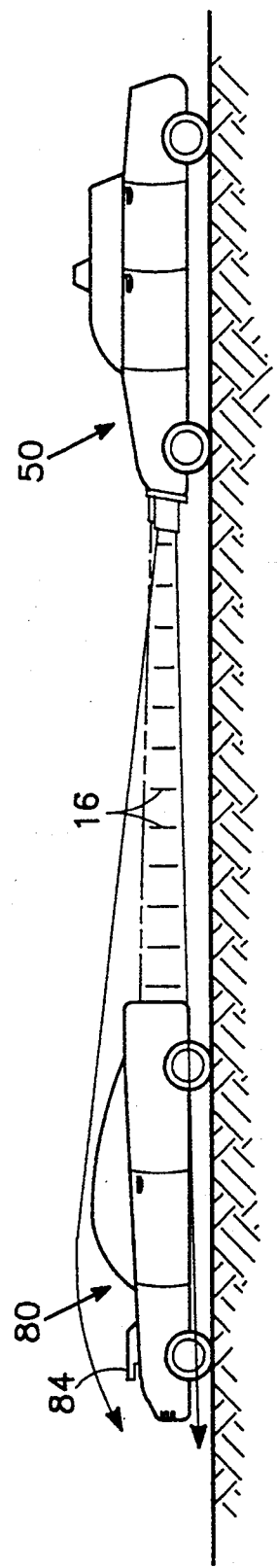
FIG. 2 depicts the automobile of FIG., 1 using the gas projection apparatus of the present invention in pursuit of a stolen vehicle.

Referring first to FIGS. 1 and 2, there is shown an automobile 50, which may be, for example, a police cruiser having the gas projection apparatus 15 mounted on its front bumper 52. Alternatively, gas projection apparatus 15 (illustrated in phantom) may be mounted on the roof 54 of automobile 50.

There is located within the trunk 56 of automobile 50 a containment vessel 58 which has liquid carbon dioxide stored therein under pressure. Containment vessel 58 is connected to gas projection apparatus 15 by a pipe 60 which is attached to and runs the length of the underside 62 of automobile 50. Pipe 60 includes a pair of electrically actuated normally closed valves 64 and 66 with valve 64 being positioned near the outlet port 70 of containment vessel 58 and valve 66, which is the trigger valve being positioned under the driver seat 72 of automobile 50. Positioned adjacent valve 66 on its outlet side is a heat exchanger 68. A forward portion of pipe 60 connects valve 66 to the inlet side of heat exchanger 68. A flexible hose 61 connects the outlet side of heat exchanger 68 to a gas inlet port 69 of gas projection apparatus 15.

Valves 66 and 68 are electrically coupled to control panel 74 which is mounted to the dash board 76 for use by the operator of automobile 50. When the operator of automobile 50 activates a switch (not illustrated) on control panel 74 valve 64 opens allowing pressurized liquid carbon dioxide to flow through pipe 60 to the inlet side of valve 66. The operator may than activate a second switch (not illustrated) on control panel 74 which opens trigger valve 66 allowing pressurized liquid carbon dioxide to pass through valve 66 to the inlet side of heat exchanger 68. Heat exchanger 68, which receives heat from the automobile engine's exhaust, heats the liquid carbon dioxide to a gaseous form. The gaseous carbon dioxide then exits heat exchanger 68 passing from the outlet side of heat exchanger 68 through flexible hose 61 to the gas inlet port 69 of gas projection apparatus 15.

At this time, it should be noted that gas projection apparatus 15 may also include a bore-sighted laser targeting system 78 mounted on the top of gas projection apparatus 15. Bore-sight laser targeting system 78 may be any well known commercially available laser targeting system which may be used to aim a projected train of ring vortices of gas at a stolen automobile 80, FIG. 2, being pursued by police cruiser 50.

It should also be noted that gas projection apparatus 15 is mounted on a two axis gimbal support system 82 attached to bumper 52 of automobile 50. Control panel 74 may include a joy stick which allows the operator of automobile 50 to move gas projection apparatus 15 in both azimuth and elevation until gas projection apparatus 15 is targeted on automobile 80. Bore-sighted laser targeting system 78 projects a collimated beam of laser light at automobile 80 providing a laser light reference spot on automobile 80 which assist the operator of police cruiser 50 in aiming gas projection apparatus 15 at automobile 80. The operator's use of targeting system 78 to aim gas projection apparatus 15 at automobile 80 maximizes the amount of carbon dioxide gas mixing with the air being drawn into the engine of automobile 80.

When activated by the operator of automobile 50, gas projection apparatus 15 directs a train of ring vortexes 16 of carbon dioxide gas at stolen automobile 80. The train of ring vortexes 16 of carbon dioxide gas will then overtake stolen automobile 80 entering the automobile's engine compartment through, for example, a hood-mounted air intake 84. The carbon dioxide, which mixes with air drawn into the automobile's engine will cause the stolen automobile's engine to slow and eventually stall allowing police cruiser 50 to overtake stolen automobile 80.

For example, assume police cruiser 50 is pursuing stolen automobile 80 at approximately 90 miles per hour which necessitates that the engine of automobile 80 operate at near maximum power output. When the engine of stolen automobile 80 is operating at maximum power output, the engine of stolen automobile will require an air/fuel mixture of about thirteen to one. Assuming a 400 cubic inch engine for stolen automobile 80, the engine of automobile 80 will draw between six and ten cubic feet of air per second, depending upon the engine's size and efficiency. By activating the gas projection apparatus 15, the operator of police cruiser 50 can direct the train of ring vortexes 16 of carbon dioxide gas at stolen automobile 80 adding about one cubic foot of carbon dioxide per second to the air/fuel mixture being supplied to the engine of stolen automobile 80. Adding about one cubic foot of carbon dioxide gas per second to the air/fuel mixture changes the air/fuel mixture to between approximately 10.8 to one and ten to one. This air/fuel mixture is off the peak power point for the engine of automobile 80 which causes the engine to lose power substantially slowing automobile 80 allowing police cruiser 50 to close the distance between the automobiles and then further incapacitate the engine of automobile 80 allowing police cruiser 50 to overtake automobile 80.

Referring to FIGS. 1 and 3 there is shown in FIG. 3 a detailed sectional of the gas projection apparatus 15. Gas projection apparatus 15 comprises a housing 17 having a centrally located shaft 18 which extends the length of housing 17 through the rear of housing 17. Shaft 18 has hollow inner portion 19 and is coupled to flexible hose 61 allowing pressurized carbon dioxide gas from containment vessel 58 to enter the hollow inner portion 19 of shaft 18 after the operator of automobile 50 opens valves 64 and 66. Shaft 18 has a plurality of openings 21 which allow pressurized carbon dioxide gas to enter a charging chamber 20 within housing 17. There is located within housing 17 at the rear of chamber 20 an inner wall 41 which includes a plurality of openings 22 which allow pressurized carbon dioxide to bleed from chamber 20 into a rear chamber 37 located at the rear of housing 17.

Chamber 37 includes a diaphragm 23 mounted therein. Diaphragm 23 is secured at its outer edge to housing 17. Shaft 18 has a cylindrical support bracket 38 positioned about its outer surface in slidable engagement with its outer surface. A flange 40 at one end of cylindrical support bracket 38 secures diaphragm 23 to shaft 18. The opposite end of cylindrical support bracket 38 has attached thereto a blast valve 25 which is maintained under pressure against a valve seat 26 within housing 17 by a spring 24 positioned around shaft 18 between valve 25 and inner wall 41.

Inner wall 41 has an aperture 35 through which support bracket 38 passes, while the rear wall 43 of housing 17 has an aperture 44 through the rear portion of shaft 18 passes. Aperture 35 of inner wall 41 and aperture 44 of rear wall 43 provide support for 18 and also allow for movement of shaft 18 within housing 17 of gas projection apparatus 15.

When the pressure of carbon dioxide gas within chamber 37 reaches about 400 psi the force exerted upon diaphragm 23 will exceed the tension maintained against valve 25 diaphragm 23 will move rearward within chamber 37 causing cylindrical support bracket 38 to move in rearward direction which unseats blast valve 25 (illustrated in phantom) from valve seat 26 within housing 17.

At this time it should be noted that the preferred embodiment of the present invention has four openings within shaft 18 each of which has a diameter of about ½ inch, while inner wall 41 also has four openings 22 each of which has a diameter of about ¼ inch. This, in turn, results in an area ratio of about four to one which insures that there will be a sufficient amount of carbon dioxide gas entering chamber 37 to exert enough pressure on diaphragm 23 to move diaphragm 23 in a rearward direction (illustrated in phantom) to unseat valve 25 from valve seat 26 allowing pressurized gas to escape from chamber 20 into a wave shaping chamber 27 located at the front portion of housing 17.

Inner wall also includes a pair of ports 36 each of which has a check valve 34. When blast valve 25 unseats from housing 17 pressurized carbon dioxide escapes from chamber 20 into chamber 27 substantially reducing the pressure within chamber 20 so that there is a pressure differential between chambers 37 and 20. This pressure differential opens check valves allowing carbon dioxide gas within chamber 37 to pass through ports 36 into chamber 20. The reduction of pressure within chamber 37 allows check valves 34 to close and also allows diaphragm 23 and shaft 18 to return to a neutral position (illustrated by FIG. 3) which seats blast valve 25 against valve seat 26 allowing gas projection apparatus 15 to repeat this cycle to generate another gas ring vortex 16.

Carbon dioxide gas under pressure will again enter chamber 20 via openings 21 within shaft 19 and then pass through openings 22 until the pressure within chamber 37 exceeds 400 psi at which time diaphragm 23 is forced rearward causing pressurized carbon dioxide to escape from chamber 20 into wave shaping chamber 27. This reduces the pressure within chamber 20 opening check valves 34 (illustrated in the open position in FIG. 3) which allows diaphragm 23 to return to its neutral position. When diaphragm 23 returns to its neutral position, blast valve 25 seats against valve seat 26 sealing off chamber 20 from chamber 27. The opening and closing of blast valve 25 is repeated at a frequency of about ten hertz, that is about ten cycles per second.

At this time it should be noted that the rear wall 43 of housing 17 has a plurality of apertures 39 which allow air to either exit the rear portion of chamber 37 into the atmosphere when diaphragm is forced in a rearward direction or enter chamber 37 when diaphragm returns to its neutral position.

When blast valve 25 unseats from housing 17 pressurized carbon dioxide escapes from chamber 20 into wave shaping chamber 27 in the manner illustrated by arrows 45. Housing 17 has at its front end a ring vortex shaping structure, designated generally by the reference numeral 28. Ring vortex shaping structure 28 includes a shaping member 46 attached to the front of shaft 18 having an outer symmetrical surface 47 which along with surface 88 functions as a supersonic nozzle at the front end of gas projection apparatus. The front end 48 of housing 17, which approximates a cylinder, has a curved inner surface 49. There is positioned between the inner curved surface 49 of housing 17 and the outer symmetrical surface 47 of shaping member 46 a shaping member 85. Shaping member 85 is, in turn, secured to housing 17 by a plurality of streamlined support blades 86.

Shaping member 85 has a concave outer surface 87 which parallels inner surface 49 of housing 17 (as is best illustrated in FIG. 3) forming an outer annular port 30. Shaping member 85 also has also curved inner surface 88 which with the outer surface of shaping member 46 forms an inner annular port 29. Carbon dioxide gas entering wave shaping chamber 27 under pressure is accelerated towards annular ports 29 and 30 which, in combination, form the ring vortexes 16 illustrated in FIG. 1.

Referring to FIGS. 3 and 4, FIG. 4 illustrates a cross sectional view of a pair of ring vortexes 31 and 32 formed by carbon dioxide gas exiting from chamber 27 through annular ports 29 and 30 into the atmosphere. Annular port 29 size and shape accelerates the expanding carbon dioxide gas to subsonic velocities in the order of between 600 ft/sec to 900 ft/sec. Annular port 30 is shaped to provide an outer lamina 89 for each wave of carbon dioxide gas exiting gas projection apparatus 15. Each resultant wave of high speed carbon dioxide gas is formed into a ring vortex 31. Ring vortex 32 is the previously formed ring vortex traveling in the direction indicated generally by arrows 31. Each ring vortex 31 or 32 is represented by a plurality of concentric streamlines 90 centered about the vortex core of carbon dioxide gas.

The relationship governing the structure, vortex strength and propagation velocity of a ring vortex (such as ring vortices 31 and 32) is the Biot-Savart formula which may be expressed as follows.

$$V = \frac{\Gamma}{2\pi r}$$

where V is the velocity of ring propagation through air, $\Gamma$ is the vortex strength, and r is the radius of the ring at the vortex core.

Vortex strength $\Gamma$ is defined as a closed integral of the tangential velocity component around a vortex core. For a ring vortex by the following relationship is applicable.

$$\Gamma = -2\pi r' u_\theta$$

where $u_\theta$ is a tangential component of vortex velocity along a circle of constant radius r'.

Vortex strength is a function of charging chamber pressure, that is pressure in chamber 20, the expansion ratio in the ring vortex forming section, that is chamber 27, and the specific characteristics of the gas being used by gas projection apparatus 15. By selecting appropriate temperature and pressure values of a gas such as carbon dioxide for use with gas projection apparatus 15 and appropriate projector dimensions for apparatus 15, the strength and velocity of the ring vortex may be determined as well as varied to meet the requirements of an individual using the gas projection apparatus of the present invention.

Figure 5:
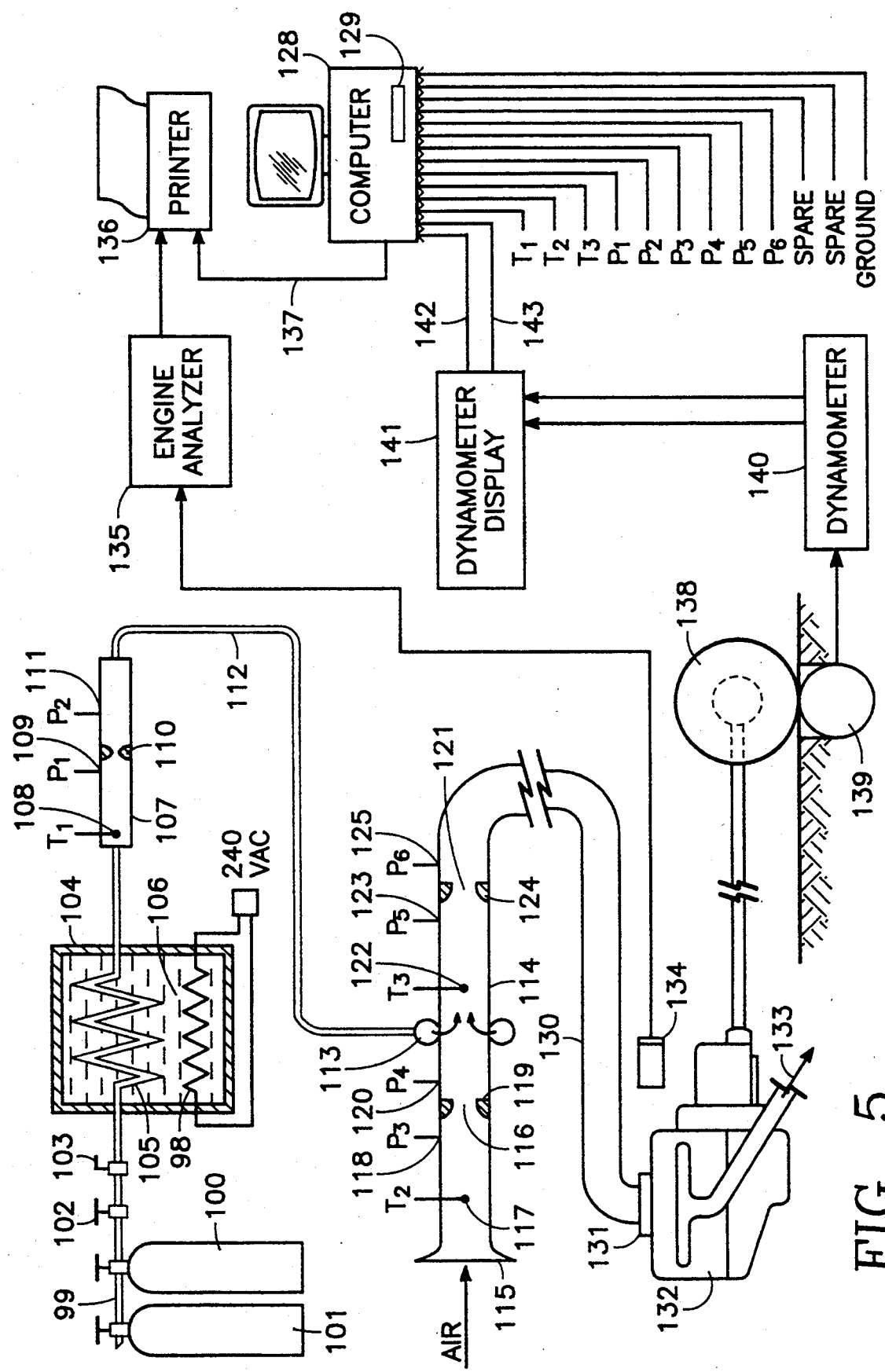
FIG. 5 is a schematic diagram depicting a test system which is used to determine the effectiveness of carbon dioxide gas at decreasing the power output of an automobile engine.

Referring now to FIG. 5, there is shown a testing system 92 which is used to determine the effect of carbon dioxide gas on the efficiency of operation of an automobile engine. Test system 92 includes a pair of liquid carbon dioxide tanks 100 and 101 for providing liquid carbon dioxide to a gasifiers 104 which heats the liquid carbon dioxide. A supply line 99 having a flow limiting valve 102 and an on/off valve 103 connects tanks 100 and 101 to the inlet side of gasifier 104.

Liquid carbon dioxide provided at pressures of between 700 psi and 900 psi flows through the flow limiting valve 102 and then on/off valve 103. Liquid carbon dioxide then enters gasifier 104 comprising heat exchanger coils 105 which receive heat from a water bath 106 within gasifier 104. The water within gasifier 104 is heated to about 180 degrees fahrenheit by an eight kilowatt electric immersion heater 98. The now gaseous carbon dioxide, still at the a pressure of between 700 psi and 900 psi flows through an orifice-type flow meter 107 consisting of a thermocouple temperature sensor 108 having an output line $T_1$, a static pressure transducer 109 having an output line $P_1$ and a static pressure transducer 111 having an output line $P_2$ Static pressure transducer 109 is positioned upstream of an orifice 110 within flow meter 107, while static pressure transducer 111 is positioned downstream of orifice 110. Flow meter 107 measures the mass flow rate of the carbon dioxide gas while the carbon dioxide gas is at approximately room temperature.

The carbon dioxide gas then flows through a flexible high pressure hose 112 to an injection manifold 113 of an air/carbon dioxide mixer 114 for uniform distribution within mixer 114. Mixer 114 comprises an air intake bell shaped port 115, and a pair of flow meters 116 and 121 having an ASME Nozzle pattern which are high volume flow rate, low pressure-drop calibrated nozzles developed by the American Society of Mechanical Engineers. Meter 116, which is located near air intake port 115 consists of a thermocouple temperature sensor 117 having an output line $T_2$, a static pressure sensor 118 having an output line $P_3$, a pressure drop-calibrated nozzle 119, and a static pressure sensor 120 having an output line $P_4$.

Flow meter 121 which is positioned downstream from flow meter 116 comprises a thermocouple temperature sensor 122 having an output line $T_3$, a static pressure sensor 123 having an output line $P_5$, a pressure drop-calibrated nozzle 124, and a static pressure sensor 125 having an output line $P_6$. Flow meter 116 measures the mass flow rate of air drawn in from the atmosphere by automobile engine 132. Flow meter 121 measures the mixed air and carbon dioxide mass flow rate being supplied to engine 132. The difference between the flow rates measured by flow meters 116 and 121 generally equals flow rate for carbon dioxide measured by flow meter 107, thereby checking the accuracy of the measurements by flow meters 107, 116 and 121. All temperature and pressure sensor output lines ($T_1$-$T_3$,$P_1$-$P_6$) are electrically coupled to a data acquisition card within a personal computer 128 where the data provided by the temperature and pressure sensors is converted by computer's software to the required format for storage on a floppy diskette 129.

The mixture of air and carbon dioxide then flows through a large flexible duct 130 directly to the carburetor intake 131 of engine 132 of the automobile being tested for vulnerability to carbon dioxide ingestion. The engine performance variables, including exhaust gas sensor outputs 133, are monitored by the engine computer 134. The output of engine computer 134 is electrically coupled to an electronic engine analyzer 135 which has its output signal supplied to a printer 136. The information provided by printer 136 is time synchronized with data being provided to computer 128 by an output time code supplied by computer 128 via data line 137 which connects the computer 128 to printer 137.

The automobile's rear drive wheels 138 engage the floor roller 139 of a dynamometer 140. Dynamometer 140 measures load torque and revolution per minute displaying these measurements on a dynamometer display 141 as analog voltages representing horse-power and miles-per-hour. These analog voltages are supplied via lines 142 and 143 to the data acquisition card of computer 128. The data acquisition card of computer 128 next converts all analog input signals to a digital form for processing by computer 128. A data acquisition card for use with computer 128 is a ACJR12 analog input board manufactured by CyberResearch, Inc., of Branford, Conn.

Figure 6A:
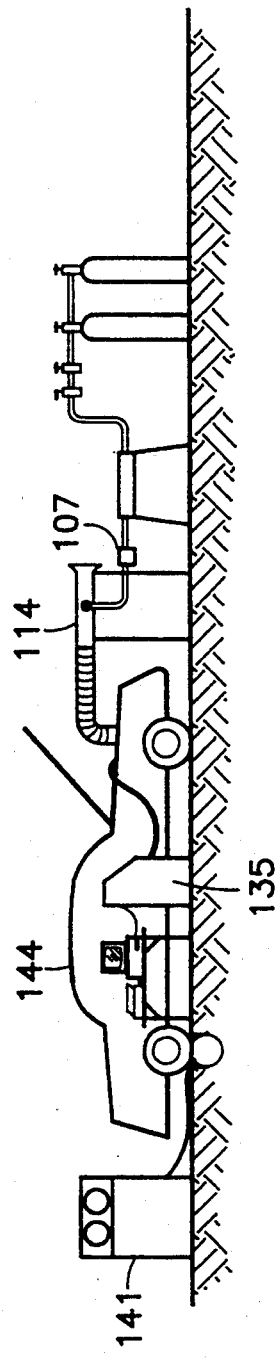
FIGS. 6A, 6B and 6C are schematic diagrams illustrating test stations which are used to determine the effectiveness of carbon dioxide gas at decreasing the power output of an automobile engine.
Figure 6B:
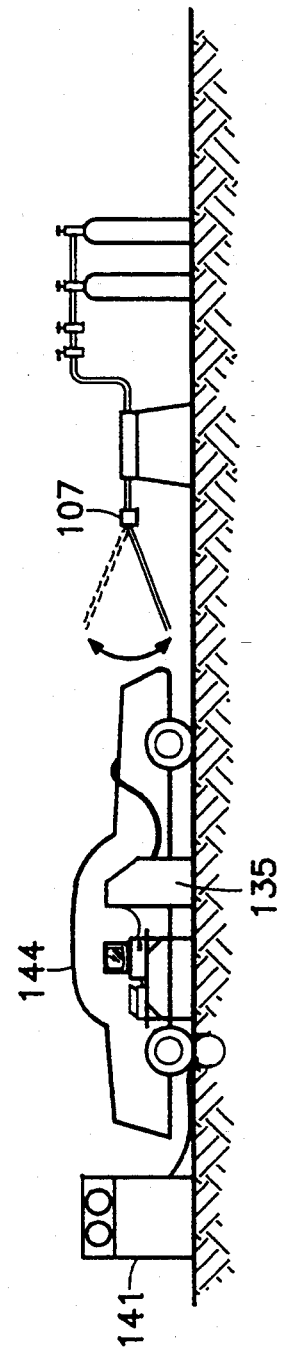
Figure 6C:
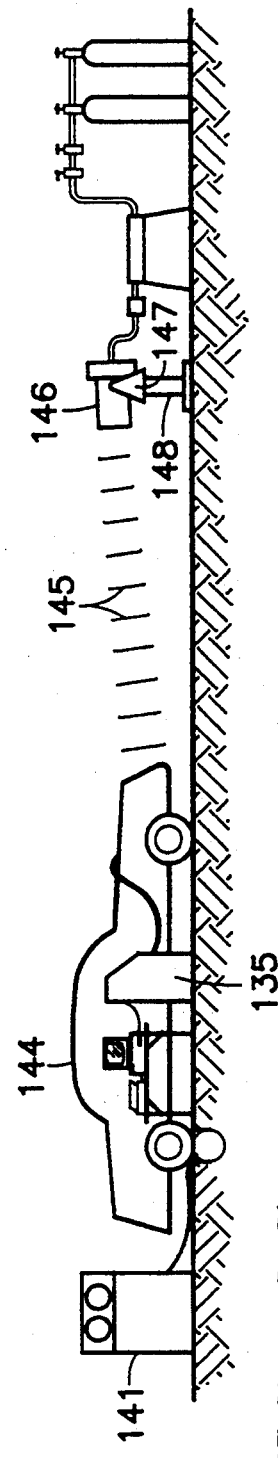

FIGS. 6A, 6B and 6C illustrate three test stations, each with a carbon dioxide delivery system which measures all variables to determine the effectiveness of carbon dioxide in stopping an automobile. In FIG. 6A the vehicle 144 is shown with a hard coupled carbon dioxide delivery system illustrated in FIG. 5. The delivery system of FIG. 6B has the air/carbon dioxide mixer 114 removed therefrom. The carbon dioxide gas is now supplied via the atmosphere into the front end of the vehicle so that portion of the air $CO_2$ mixture which is carbon dioxide entering the carburetor is unknown. However, the vehicle response measured by engine analyzer 135 and dynamometer display 141 is known as well as the $CO_2$ flow rate measured by flow meter 107. FIG. 6C illustrates carbon dioxide gas being delivered by a train of ring vortices 145 projected from a projector 146 of the type shown in FIG. 2 mounted on an aiming gimbal 147 which is, in turn, mounted on a pedestal 148.

From the foregoing, it may readily be seen that the present invention comprises a new, unique and exceedingly useful gas projection apparatus for use in preventing the theft of an automobile which constitutes a considerable improvement over the known prior art. Obviously many modifications and variations of the present invention are possible in light of the above teachings. It is therefore to be understood that within the scope of the appended claims, the invention may be practiced otherwise than as specifically described.

What is claimed is:

1. A gas projection apparatus for aiding in the prevention of a theft of an automobile, said gas projection apparatus comprising:

a source for providing carbon dioxide gas under pressure;

a housing having a charging chamber, a rear chamber adjacent said charging chamber and a wall interposed between said charging chamber and said rear chamber, said wall having a plurality of openings;

a wave shaping chamber located in a front portion of said housing, said wave shaping chamber being adjacent said charging chamber;

a blast valve resting on a valve seat located within said housing, said blast valve being interposed between said charging chamber and said wave shaping chamber to seal said charging chamber from said wave shaping chamber;

a shaft centrally located within said housing, said shaft having a hollow inner portion and a plurality of openings, the openings of shaft being located within said charging chamber, said shaft being connected to said source allowing said carbon dioxide gas under pressure to flow from said source through the openings of said shaft into said charging chamber;

a diaphragm mounted within said rear chamber of said housing;

a cylindrical support bracket positioned about an outer surface of said shaft in slidable engagement with the outer surface of said shaft, said cylindrical support bracket having one end attached to said diaphragm and an opposite end attached to said blast valve;

a portion of said carbon dioxide gas under pressure entering said rear chamber through the openings of said wall, the portion of said carbon dioxide gas within said rear chamber exerting a force upon said diaphragm moving said diaphragm and said cylindrical support bracket in a rearward direction to open said blast valve allowing a remaining portion of said carbon dioxide to enter said wave shaping chamber; and said housing having an outer annular port and an inner annular port at a front end thereof, said outer annular port and said inner annular port communicating with said wave shaping chamber allowing said carbon dioxide gas to exit said wave shaping chamber and pass through said inner annular port and said outer annular port to form a ring vortex of carbon dioxide gas;

said carbon dioxide gas within said rear chamber exiting said rear chamber into said charging chamber after said blast valve opens allowing said diaphragm to return to a neutral position closing said blast valve;

said blast valve opening and closing at a predetermined frequency causing said gas projection apparatus to generate a train of ring vortices of carbon dioxide gas.

2. The gas projection apparatus of claim 1 wherein said predetermined frequency of said blast valve opening and closing is about ten cycles per second.

3. The gas projection apparatus of claim 1 wherein said source for providing carbon dioxide gas under pressure comprises:

a containment vessel of liquid carbon dioxide under pressure, said containment vessel having an outlet port;

a first normally closed valve having a fluid inlet connected to the outlet port of said containment vessel and a fluid outlet;

a second normally closed valve having a fluid inlet connected to the fluid outlet of said first normally closed valve and a fluid outlet; and a heat exchanger having a fluid inlet connected to the fluid outlet of said second normally closed valve and a gas outlet connected to said shaft, said heat exchanger converting said liquid carbon dioxide to said carbon dioxide gas.

4. The gas projection apparatus of claim 1 further comprising a bore-sighted laser targeting system mounted on a top portion of said housing.

5. The gas projection apparatus of claim 1 further comprising a spring disposed around the outer surface of said shaft between said blast valve and said wall of said housing.

6. The gas projection apparatus of claim 1 further comprising a plurality of check valves, one of said check valves being disposed within each of said plurality of openings of said wall.

7. The gas projection apparatus of claim 1 further comprising a two axis gimbal support system, said two axis gimbal support system being adapted for mounting said gas projection apparatus to a front bumper of a police cruiser.

8. A gas projection apparatus for aiding in the prevention of a theft of an automobile, said gas projection apparatus comprising:

a containment vessel for providing liquid carbon dioxide under pressure, said containment vessel having an outlet port;

a heat exchanger having a fluid inlet connected to the outlet port of said containment vessel and a gas outlet, said heat exchanger converting said liquid carbon dioxide to a carbon dioxide gas under pressure;

a housing having a charging chamber, a rear chamber adjacent said charging chamber and a wall interposed between said charging chamber and said rear chamber, said wall having a plurality of openings;

a wave shaping chamber located in a front portion of said housing, said wave shaping chamber being adjacent said charging chamber;

a blast valve resting on a valve seat located within said housing, said blast valve being interposed between said charging chamber and said wave shaping chamber to seal, said charging chamber from said wave shaping chamber;

a shaft centrally located within said housing, said shaft having a hollow inner portion and a plurality of openings, the openings of said shaft being located within said charging chamber, said shaft being connected to the gas outlet of said heat exchanger allowing said carbon dioxide gas under pressure to flow from said source through the openings of said shaft into said charging chamber;

a diaphragm mounted within said rear chamber of said housing;

a cylindrical support bracket positioned about an outer surface of said shaft in slidable engagement with the outer surface of said shaft, said cylindrical support bracket having one end attached to said diaphragm and an opposite end attached to said blast valve;

a portion of said carbon dioxide gas under pressure entering said rear changer through the openings of said wall, the portion of said carbon dioxide gas within said rear chamber exerting a force upon said diaphragm moving said diaphragm and said cylindrical support bracket in a rearward direction to open said blast valve allowing a remaining portion of said carbon dioxide to enter said wave shaping chamber; and said housing having an outer annular port and an inner annular port at a front end thereof, said outer annular port and said inner annular port communicating with said wave shaping chamber allowing said carbon dioxide gas to exit said wave shaping chamber and pass through said inner annular port and said outer annular port to form a ring vortex of carbon dioxide gas;

said carbon dioxide gas within said rear chamber exiting said rear chamber into said charging chamber after said blast valve opens allowing said diaphragm to return to a neutral position closing said blast valve;

said blast valve opening and closing at a frequency of about ten cycles per second causing said gas projection apparatus to generate a train of ring vortices of carbon dioxide gas;

said gas projection apparatus aiming said train of ring vortices of carbon dioxide gas at said automobile causing a mixture of air and carbon dioxide gas to be drawn into an engine of said automobile.

9. The gas projection apparatus of claim 8 further comprising a bore-sighted laser targeting system mounted on a top portion of said gas projection apparatus.

10. The gas projection apparatus of claim 8 further comprising a spring disposed around the outer surface of said shaft between said blast valve and said wall of said housing.

11. The gas projection apparatus of claim 8 further comprising a plurality of check valves, one of said check valves being disposed within each of said plurality of openings of said wall.

12. The gas projection apparatus of claim 8 further comprising at least one normally closed valve, said at least one normally closed valve having a fluid inlet connected to the outlet port of said containment vessel and a fluid outlet connected to the fluid inlet of said heat exchanger.

13. The gas projection apparatus of claim 8 further comprising a two axis gimbal support system, said two axis gimbal support system being adapted for mounting said gas projection apparatus to a front bumper of a police cruiser.

* * * * *